(12) United States Patent
Goering (10) Patent No.: US 9,186,850 B2
(45) Date of Patent: Nov. 17, 2015

(54) FIBER PREFORM, FIBER REINFORCED COMPOSITE, AND METHOD OF MAKING THEREOF

(75) Inventor: Jonathan Goering, York, ME (US)

(73) Assignee: Albany Engineered Composites, Inc., Rochester, NH (US)

(*) Notice: Subject to any disclaimer, the term of this patent is extended or adjusted under 35 U.S.C. 154(b) by 1166 days.

(21) Appl. No.: 12/607,715

(22) Filed: Oct. 28, 2009

(65) Prior Publication Data

US 2011/0097526 A1    Apr. 28, 2011

(51) Int. Cl.
| | |
|---|---|
| B32B 3/26 | (2006.01) |
| B29C 70/22 | (2006.01) |
| B29B 11/16 | (2006.01) |
| D03D 3/00 | (2006.01) |
| D03D 3/08 | (2006.01) |

(52) U.S. Cl.
CPC .............. *B29C 70/222* (2013.01); *B29B 11/16* (2013.01); *D03D 3/00* (2013.01); *D03D 3/08* (2013.01); *Y10T 428/1362* (2015.01); *Y10T 428/24074* (2015.01)

(58) Field of Classification Search
CPC ...... B29C 53/562; B29C 70/32; B29C 53/58; B29C 70/222; D03D 3/00; D03D 3/08
USPC ....................................................... 428/36.1
See application file for complete search history.

(56) References Cited

U.S. PATENT DOCUMENTS

| | | | |
|---|---|---|---|
| 3,067,079 A * | 12/1962 | Chinn | 229/93 |
| 3,870,478 A | 3/1975 | Rohlfing | |
| 4,467,838 A | 8/1984 | Rheaume | |
| 5,100,713 A * | 3/1992 | Homma et al. | 428/102 |
| 5,242,745 A * | 9/1993 | Aucagne et al. | 442/205 |
| 5,266,021 A | 11/1993 | Jacobson | |
| 5,368,076 A | 11/1994 | Curzio | |
| 5,394,906 A | 3/1995 | Farley | |
| 5,573,716 A | 11/1996 | Jacobson | |
| 5,702,795 A * | 12/1997 | Matsumoto et al. | 428/66.6 |
| 5,876,322 A | 3/1999 | Piramoon | |

(Continued)

FOREIGN PATENT DOCUMENTS

| | | |
|---|---|---|
| CA | 2 238 835 C | 3/2006 |
| DE | 10 2008 051 121 A | 4/2010 |

(Continued)

OTHER PUBLICATIONS

International Search Report and Written Opinion issued by European Patent Office for corresponding international application PCT/US2010/054117 dated Apr. 4, 2011.

*Primary Examiner* — Elizabeth M Cole (74) *Attorney, Agent, or Firm* — Frommer Lawrence & Haug LLP (57) ABSTRACT

A woven fiber preform, a fiber reinforced composite incorporating the preform, and methods of making thereof are disclosed. The woven preform includes a plurality of warp and weft yarns or fibers interwoven to form a continuous spiral fabric. The spiral fabric may take the shape of an Archimedes spiral. The weft yarns in the preform may have a uniform or variable pick spacing, or a uniform or variable angular separation. The spiral fabric of the Archimedes spiral may be assembled or wrapped to form a conical shell structure, which could be a portion of a spinner or an exit cone. The spiral fabric may be woven on a loom equipped with a differential take-up mechanism.

35 Claims, 6 Drawing Sheets

(56) References Cited

U.S. PATENT DOCUMENTS

| | | |
|---|---|---|
| 6,007,319 A | 12/1999 | Jacobson |
| 6,575,201 B2 | 6/2003 | Buesgen |
| 7,077,167 B2 | 7/2006 | Nayfeh et al. |
| 7,338,684 B1 | 3/2008 | Curliss et al. |
| 2007/0079886 A1 | 4/2007 | Ge |

FOREIGN PATENT DOCUMENTS

| | | |
|---|---|---|
| FR | 2633213 A | 12/1989 |
| GB | 1 356 651 | 6/1974 |
| GB | 2 177 062 A | 1/1987 |
| JP | 06-170958 A | 6/1994 |

* cited by examiner

FIBER PREFORM, FIBER REINFORCED COMPOSITE, AND METHOD OF MAKING THEREOF

BACKGROUND OF THE INVENTION

1. Field of the Invention

This invention generally relates to fiber reinforced composites and particularly relates to preforms having woven strips of material used in reinforced composite materials, which can be woven flat and folded into their final shape.

2. Incorporation by Reference

All patents, patent applications, documents, references, manufacturer's instructions, descriptions, product specifications, and product sheets for any products mentioned herein are incorporated herein by reference, and may be employed in the practice of the invention.

3. Description of the Prior Art

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, recreational (as in racing boats and automobiles), and other applications.

Typically such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted or braided. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical, and/or other properties. The materials chosen for use as the matrix may or may not be the same as that of the reinforcement preform and may or may not have comparable physical, chemical, thermal or other properties. Typically, however, they will not be of the same materials or have comparable physical, chemical, thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform.

Frequently, it is desired to produce components in configurations that are other than such simple geometric shapes as plates, sheets, rectangular or square solids, etc. A way to do this is to combine such basic geometric shapes into the desired more complex forms. In any such shapes, a related consideration is to make each juncture between the constituent components as strong as possible. Given the desired very high strength of the reinforcement preform constituents per se, weakness of the juncture becomes, effectively, a "weak link" in a structural "chain".

While the prior art has sought to improve upon the structural integrity of the reinforced composite and has partly achieved success, there exists a desire to improve thereon or address the problem through an approach different from the use of adhesives or mechanical coupling. In this regard, one approach might be by creating a woven three dimensional ("3D") structure by specialized machines. However, the expense involved is considerable and rarely is it desirable to have a weaving machine directed to creating a single structure. Another approach would be to weave a two dimensional ("2D") structure and fold it into 3D shape so that the panel is integrally woven, i.e. yarns are continuously interwoven between the planar base or panel portion and other constituent portions.

Figure 1A:
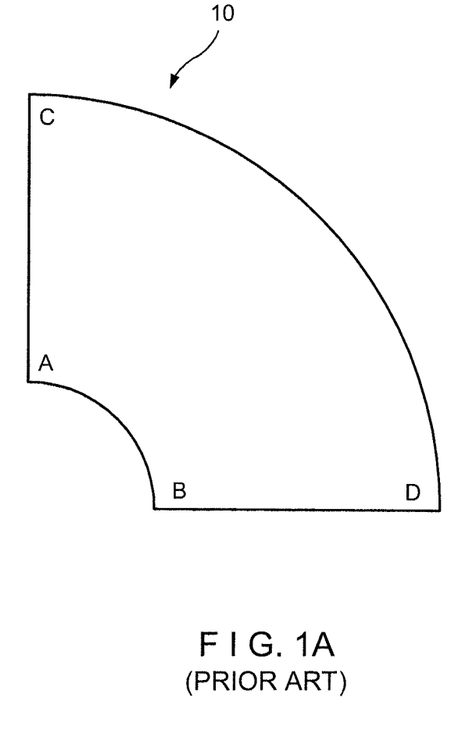
FIG. 1A is a schematic of a sector of an annulus of a flat pattern.
Figure 1B:
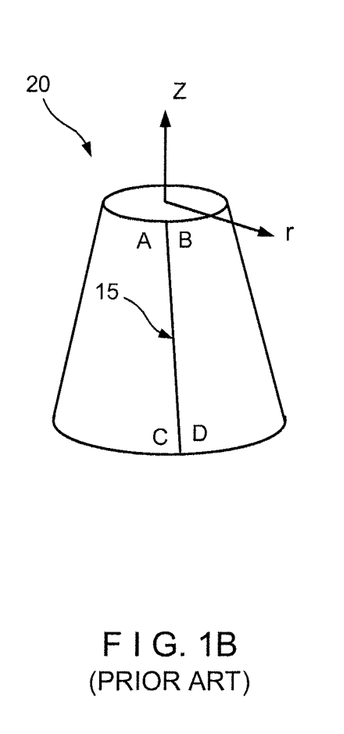
FIG. 1B is a schematic of a cone formed by wrapping the flat pattern shown in FIG. 1A.

The increased use of composite materials having such fiber preform reinforcements in aircrafts and jet engines has led to the need for composite conical shells. The traditional approach for forming a conical shell has been to generate a flat pattern 10 that is in the shape of a sector of an annulus, as shown in FIG. 1A. This shape is predisposed to take on the shape of a frustum of a cone 20 when it is folded so that the two straight edges 15 are aligned with one another, as shown in FIG. 1B. The flat pattern 10 can be cut from conventional 2D fabric, or can be woven directly into the annular shape using polar weaving equipment, for example.

Both methods, however, have certain limitations. Using 2D fabric results in a uniform thickness shell, with uniform distribution of fiber in two directions, but the fiber directions will not be aligned with the principle directions of the cone, i.e. the circumferential and axial directions. Polar weaving, on the other hand, will orient fiber in the principal directions, but the fiber distribution will vary in the axial direction. In either case, there will be a discontinuous seam where the two straight edges come together. Additionally, although the cone can have practically any dimensions, the maximum size that can be fabricated from a single flat pattern is limited by the size of the loom, and there can be substantial waste material if conventional 2D fabrics are used to produce the cone. Using a single piece of fabric is, however, desirable because it minimizes the number of seams and reduces the touch labor required to cut and position the fabric.

SUMMARY OF THE INVENTION

The present invention overcomes the size restriction and some of the fiber distribution problems of conventional methods.

One object of the present invention is to produce a conical shell in which the constituent fiber directions are aligned with the principle directions of the cone, i.e. the circumferential and axial directions. This results in a preform with uniform strength and stiffness with respect to the principal coordinate system, and maximizes strength and stiffness in the principal directions of the resultant structure.

Another object of the present invention is to produce a conical shell with uniform fiber distribution in the circumferential as well as axial directions.

Yet another object of the present invention is to produce a conical shell with continuous hoop fiber across the entire surface area of the composite so there is no discontinuous seam formed in the structure in the Z direction.

Yet another object of the present invention is to produce a conical shell of practically any size.

Yet another object of the present invention is to produce a conical shell with the least amount of wastage of fabric material.

Yet another object of the present invention is to produce a conical shell using a single piece of fabric to minimize the number of pieces and reduce touch labor.

Accordingly, one exemplary embodiment of the present invention is a fiber preform including a plurality of warp and weft yarns or fibers interwoven to form a continuous spiral fabric. The spiral fabric may take the shape of an Archimedes spiral. The weft yarns in the preform may have a uniform or variable pick spacing, or a uniform or variable angular separation. The fabric shaped in the Archimedes spiral may be assembled or wrapped to form a conical shell structure, which could be a portion of a spinner or an exit cone. The Archimedes spiral fabric may be woven on a loom equipped with a differential take-up mechanism. The preform can also include a second layer of Archimedes spiral fabric woven with a plurality of warp and weft yarns or fibers, and the second Archimedes spiral fabric can be wrapped over the first Archimedes spiral fabric to provide extra strength or to produce a balanced preform.

The invention, according to another exemplary embodiment, is a fiber reinforced composite including the fiber preform.

The invention, according to a further embodiment, is a method of forming a fiber preform, the method including the steps of: interweaving a plurality of warp and weft yarns or fibers to form a continuous spiral fabric in the shape of an Archimedes spiral, assembling or wrapping the spiral fabric of the Archimedes spiral onto a shaped mandrel to form a conical shell structure, and trimming top and bottom edges of the conical shell along corresponding trim lines. The method can also include weaving a second continuous Archimedes spiral fabric with a plurality of warp and weft yarns or fibers, and wrapping the second Archimedes spiral fabric over the first Archimedes spiral fabric to provide extra strength or to produce a balanced preform. The weft yarns may be inserted with a uniform or variable pick spacing, or a uniform or variable angular separation. The Archimedes spiral fabric may be woven on a loom equipped with a differential take-up mechanism.

The invention, according to a further embodiment, is a method of forming a fiber reinforced composite including the fiber preform.

The preforms of the invention can be a single layer weave or a multilayer weave fabric woven using any convenient pattern for the warp fiber, i.e., ply-to-ply, through thickness angle interlock, orthogonal, etc. While a plain weave is preferred for the structure, the preform can be woven using practically any conventional weave pattern, such as plain, twill, satin etc. Similarly, while carbon fiber is preferred, the invention is applicable to practically any other fiber type.

Potential applications for the fiber preform of the invention include spinners or exit cones for jet engines.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred, but non-limiting, embodiments of the invention are illustrated and the accompanying drawings in which corresponding components are identified by the same reference numerals.

Terms "comprising" and "comprises" in this disclosure can mean "including" and "includes" or can have the meaning commonly given to the term "comprising" or "comprises" in US Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings.

DETAILED DESCRIPTION OF THE PREFERRED EMBODIMENTS

The instant invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

In the following description, like reference characters designate like or corresponding parts throughout the figures. Additionally, in the following description, it is understood that such terms as "upper," "lower," "top," "bottom," "first," "second," and the like are words of convenience and are not to be construed as limiting terms.

The invention, according to one exemplary embodiment, is a method for producing a fiber preform, for example a conical shell, by using a relatively narrow fabric that is woven in the shape of an Archimedes spiral. An example of a preform 100 that may be produced using this method is shown in its unwrapped form in FIG. 2.

Figure 2:
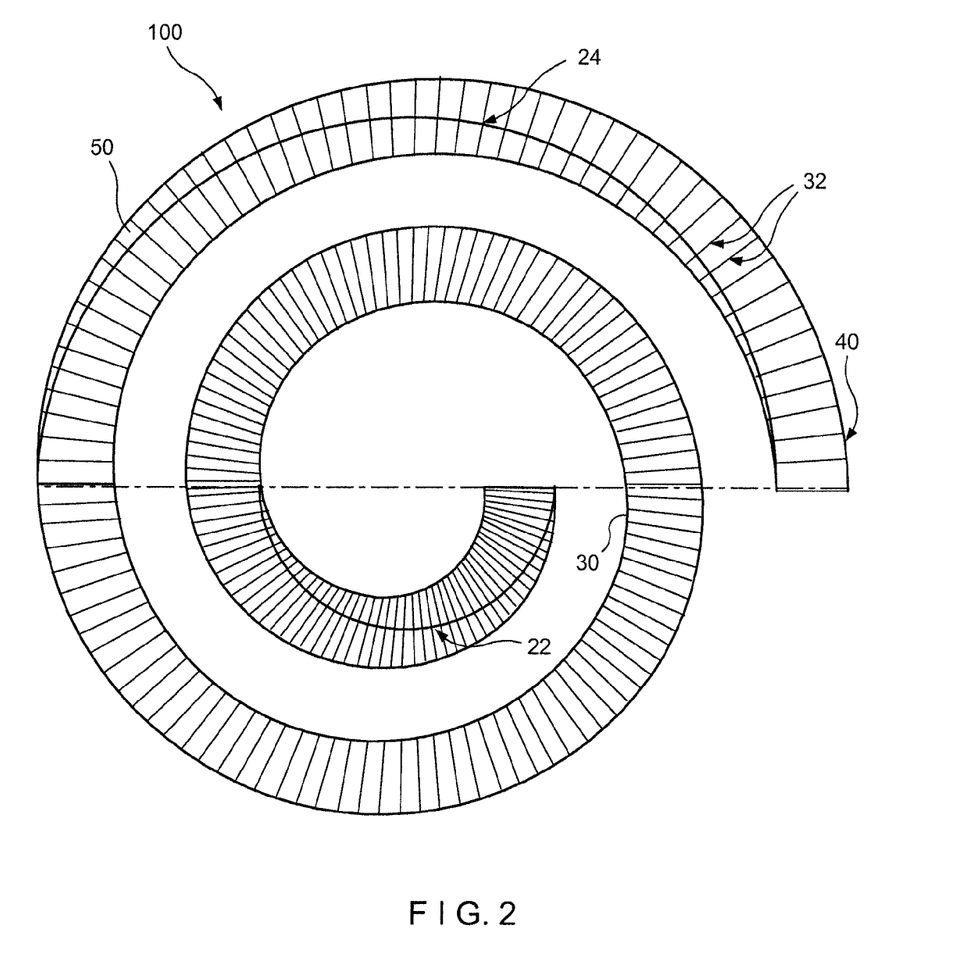
FIG. 2 is a schematic of an Archimedes spiral fabric formed according to one aspect of the invention.

Spiral fabric 50 is woven using warp and weft fibers or yarns, which may be made of any material suitable for the purpose, or any material which exhibits the desired physical, thermal, and/or chemical properties. Carbon, nylon, rayon, glass fiber, ceramic, aramid, polyester, and metal yarns or fibers are but a few examples. While flat multifilament yarns are preferred, yarns or fibers of any form may be used, e.g. monofilaments, flat monofilaments, multifilament yarns, textured multifilament yarns, twisted multifilament yarns, braided structures, or combinations thereof. Each of the yarn components or fibers may be coated with one or more layers of a coating, for example, a finish or any other coating that may enhance the performance of the component fibers, if required.

Spiral fabric 50 may be woven on a shuttle loom, or any other loom that can be equipped with a differential take up system, for example. A differential take up system allows the edges of the fabric to be advanced at different rates so that the fabric can be provided with a desired and natural in-plane curvature. The system can be programmable so that different take up amounts can be specified for each pick. Spirals 30 and 40 in FIG. 2, for example, represent the edges of spiral fabric 50 and are parallel to the warp fibers, and lines 32 represent paths of weft fibers of the preform. Semi-circles 22, 24 are trim lines indicating the top and bottom edges of the cone 100, which may be trimmed in order to make the edges flat and parallel to one another. Semi-circle 22 is, for example, a cut line for the top or upper edge of cone 100, and semi-circle 24 is, for example, a cut line for the bottom or lower edge of cone 100.

Figure 3A:
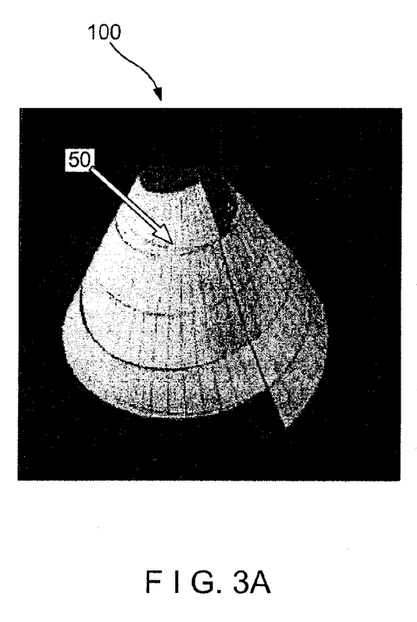
FIGS. 3A and 3B are different views of a conical shell preform formed according to one aspect of the present invention.
Figure 3B:
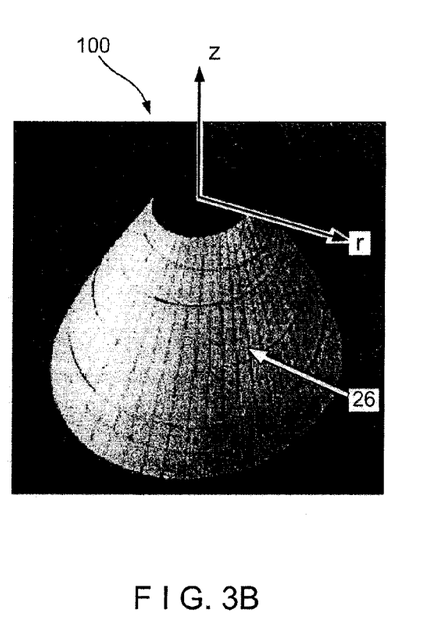

As illustrated in FIG. 3A, the take up system of the weaving machine may be selected to produce a spiral fabric so that the angle between successive weft fibers is constant and all weft fibers are of the same length. This produces a uniform width fabric 50 that has axial fibers that are aligned in the r-z planes when the fabric is wound onto a shaped mandrel into a cone, as shown in FIG. 3B. The warp fibers are oriented along a shallow helix 26 that winds continuously around the cone.

Figure 4:
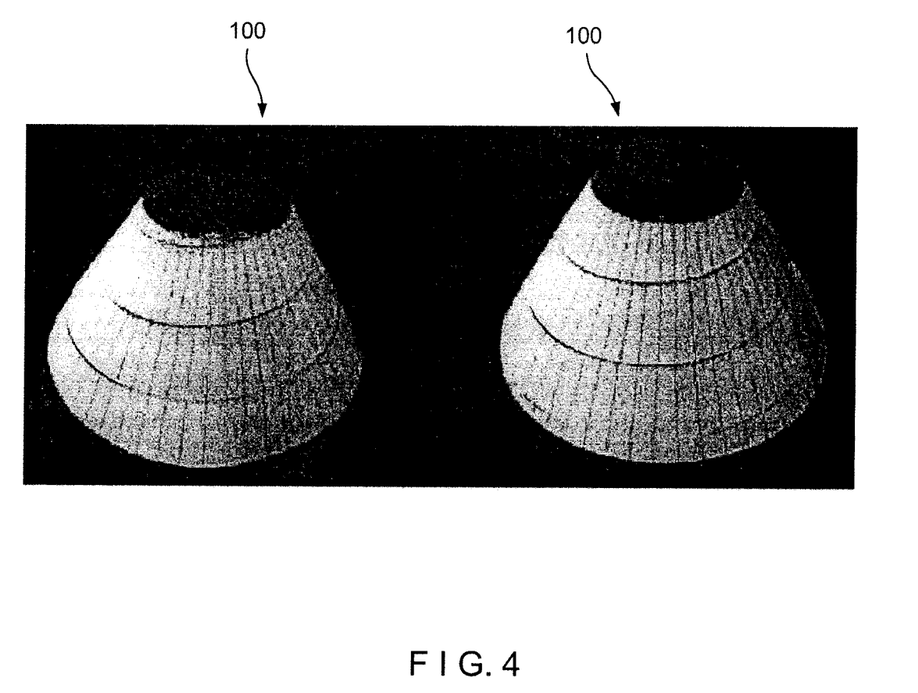
FIG. 4 is a trimmed conical shell preform formed according to one aspect of the invention.

According to one embodiment, a complementary fabric (not shown) with warp fibers oriented along a helix in the opposite direction may be wrapped over the first fabric 50 to produce a balanced preform. The complementary fabric may or may not be the same as the first spiral fabric. Additional layers of spiral fabric may be used for enhanced physical properties, such as, for example, extra strength. As mentioned earlier, this preform can also be trimmed along the semicircular paths shown in FIG. 2, resulting in a frustum of the conical shell 100. Alternatively, both fabrics may first be wrapped around a shaped mandrel, one over the other, and then the top and bottom edges of the cone 100 may be trimmed. It should, however, be noted that trimming of the top and bottom edges is the only cutting required in the instant method since the fabric 50 is inherently predisposed to wind onto the shaped mandrel or cone with no gaps or overlaps between adjacent windings. An example of a trimmed conical shell preform 100 formed according to the method of the invention is shown in FIG. 4, for example.

Figure 5:
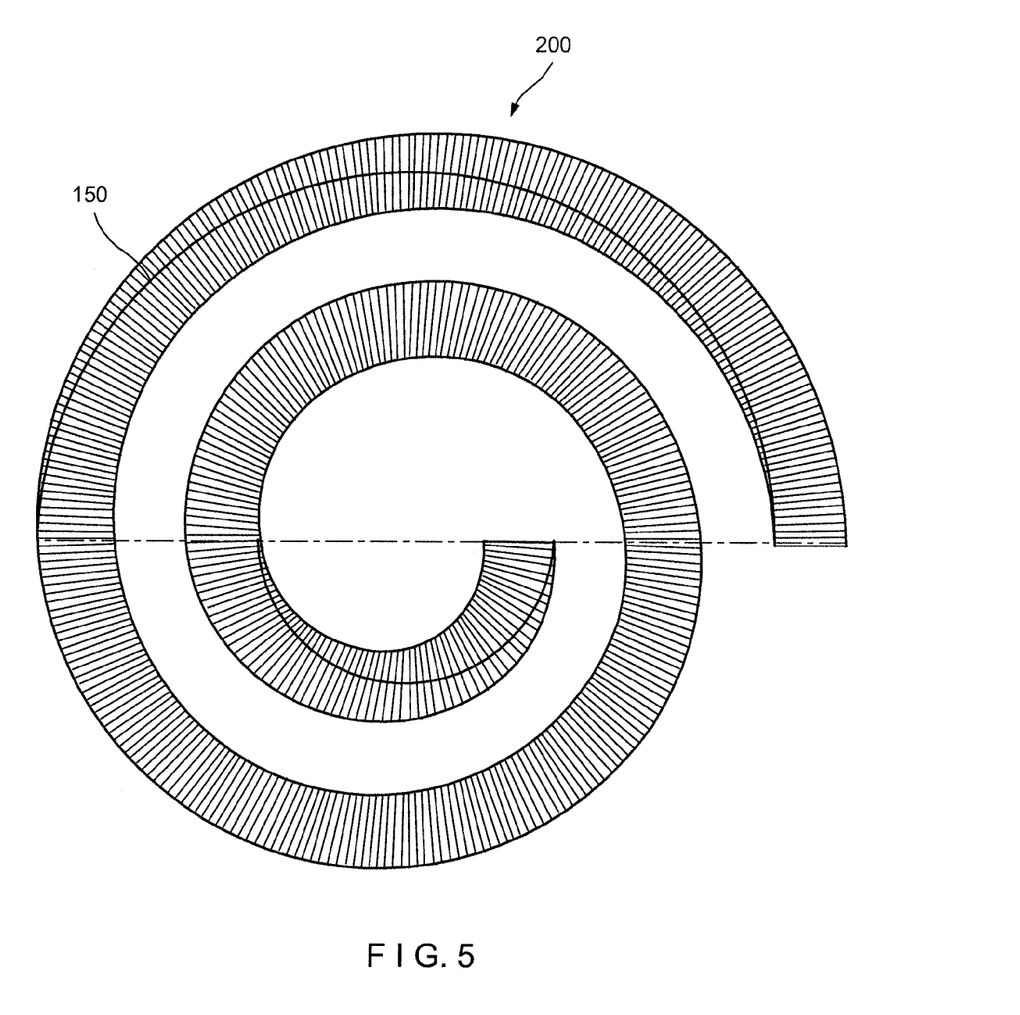
FIG. 5 is a schematic of an Archimedes spiral fabric formed according to one aspect of the invention.
Figure 6:
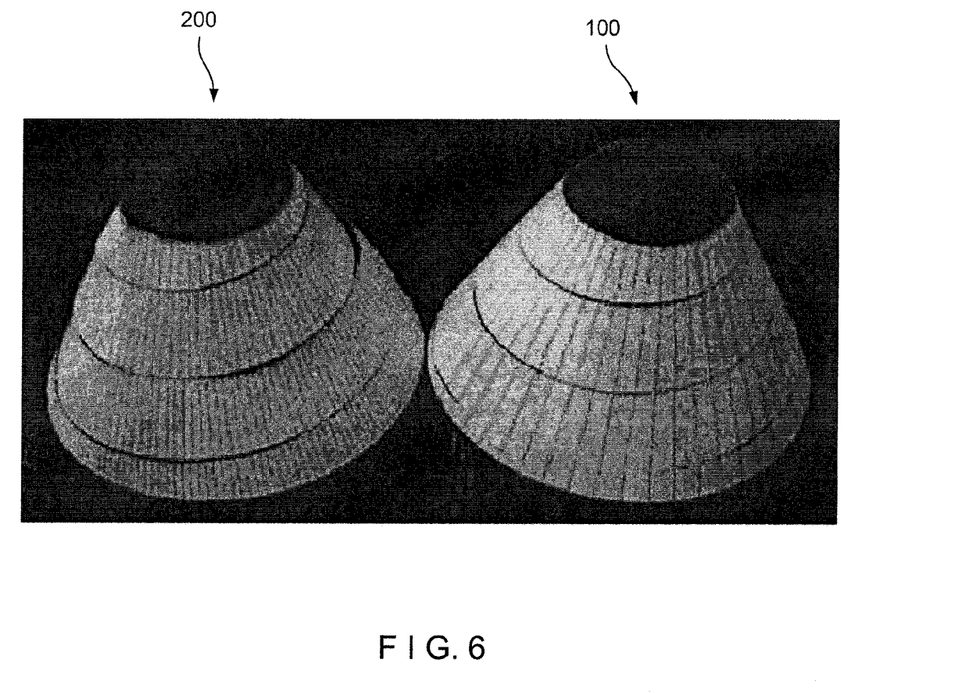
FIG. 6 shows trimmed conical shell preforms formed according to different aspects of the invention.

In the above embodiment, the weft fibers may tend to accumulate at the narrow end of the cone, much like they would in a polar woven fabric. This can, however, be eliminated by weaving a spiral fabric 150 with a uniform arc length or uniform pick spacing between adjacent weft fibers rather than having a uniform angle, according to one exemplary embodiment of the invention. This results in a spiral fabric 150 that maintains uniform balance between warp and weft fiber over the entire surface of the cone 200, as shown in FIG. 5, for example. FIG. 5 is an example of a flat pattern for a fabric 150 with uniform pick spacing, and FIG. 6, for example, illustrates both the uniform pick spacing design 200 and the uniform angular separation design 100 of the present invention. It should be noted, however, that although designs with wefts having uniform pick spacing and uniform angular separation are described herein, the present invention is not limited as such. For example, both pick spacing and/or angular separation of the weft yarns or fibers may be variable, in that the fabric may have uniform pick spacing in the main body of the cone, but may vary as it gets close to the tip of the cone where it is difficult to pack the same amount of fiber.

As described above, the methods and preforms of the present invention overcome the size restriction and some of the fiber distribution problems of conventional methods. The constituent fiber directions of the instant conical shell are very nearly aligned with the principle directions of the cone, i.e. the circumferential and axial directions. This results in a preform with uniform strength and stiffness with respect to the principal coordinate system, and maximizes strength and stiffness in the principal directions of the resultant structure. Additionally, the conical shell can have uniform fiber distribution in the circumferential as well as axial directions, and also has continuous hoop fiber across the entire surface area of the composite so there is no discontinuous seam formed in the circumferential direction of the structure.

Yet another advantage of the present invention is that the conical shell can be of practically any size, and can be produced with the least amount of wastage of fabric material. Additionally, the conical shell can be produced using a single piece of fabric to minimize the number of pieces and reduce touch labor.

The preforms of the invention can be a single layer weave or a multilayer weave fabric woven using any convenient pattern for the warp fiber, i.e., ply-to-ply, through thickness angle interlock, orthogonal, etc. While a plain weave is preferred for the structure, the preform can be woven using practically any conventional weave pattern, such as plain, twill, satin etc. Similarly, while carbon fiber is preferred, the invention is applicable to practically any other fiber type.

After the preform 100, 200 is assembled or wrapped into the desired conical shell shape, preform 100, 200 may be formed into a composite for use in conical structures such as spinners or exit cones for jet engines. Preform 100, 200 can be, for example, processed into a reinforced composite by impregnating it with a matrix material, such as for example, epoxy, bismaleimide, polyester, vinyl-ester, ceramic, and carbon, using any conventional resin infusion method, such as, for example, resin transfer molding, chemical vapor filtration, wet layup or resin film infusion, thereby forming a three dimensional composite structure.

Potential applications for the woven preform of the invention include any structural application that utilizes an Archimedes spiral structure or conical shell structure, although only spinners or exit cones for jet engines are mentioned as examples herein.

Although preferred embodiments of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. A fiber preform comprising:
a plurality of warp and weft yarns or fibers, wherein the warp and weft yarns or fibers are interwoven to form a flat pattern of a continuous spiral fabric,
wherein said spiral fabric is wound onto a shaped mandrel a plurality of times with no gaps or overlaps between adjacent windings to form a conical shell structure, and
wherein a width of the spiral fabric is contained in a lateral surface of the conical shell structure formed by winding the spiral fabric.

2. The preform of claim 1, wherein the spiral fabric is in the shape of an Archimedes spiral.

3. The preform of claim 1, wherein the weft yarns have a uniform or variable pick spacing.

4. The preform of claim 1, wherein the weft yarns have a uniform or variable angular separation.

5. The preform of claim 1, wherein the conical shell structure is a portion of a spinner or exit cone.

6. The preform of claim 1, wherein the spiral fabric is woven on a loom equipped with a differential take-up mechanism.

7. The preform of claim 1, further comprising:
a second continuous spiral fabric woven with a plurality of warp and weft yarns or fibers.

8. The preform of claim 7, wherein the second spiral fabric is in the shape of an Archimedes spiral.

9. The preform of claim 7, wherein the second spiral fabric is same as or different from the first spiral fabric.

10. The preform of claim 7, wherein the second spiral fabric is wrapped in the opposite direction over the spiral fabric of claim 1.

11. The preform of claim 1 or 7, wherein the warp and weft yarns or fibers are selected from the group consisting of carbon, nylon, rayon, glass fiber, ceramic, aramid, polyester, and metal yarns or fibers.

12. The preform of claim 1 or 7, wherein the warp and weft yarns or fibers are selected from the group consisting of monofilaments, flat monofilaments, multifilament yarns, flat multifilament yarns, textured multifilament yarns, twisted multifilament yarns, and braided structures.

13. The preform of claim 1 or 7, wherein the warp and weft yarns or fibers are coated with one or more layers of a coating, a finish or any other coating that enhances the performance of the component fibers.

14. A fiber reinforced composite comprising the fiber preform according to claim 1.

15. The composite of claim 14, further comprising a matrix material.

16. The composite of claim 15, wherein the matrix material is a resin, and the composite is formed from a process selected from the group consisting of resin transfer molding, chemical vapor filtration, wet layup and resin film infusion.

17. The composite of claim 15, wherein the matrix material is selected from the group consisting of epoxy, bismaleimide, polyester, vinyl-ester, ceramic, and carbon.

18. The composite of claim 14, wherein the composite is a spinner or exit cone.

19. A method of forming a fiber preform, the method comprising the steps of:
interweaving a plurality of warp and weft yarns or fibers to form a flat pattern of a continuous spiral fabric,
wherein said spiral fabric is wound onto a shaped mandrel a plurality of times with no gaps or overlaps between adjacent windings to form a conical shell structure, and
wherein a width of the spiral fabric is contained in a lateral surface of the conical shell structure formed by winding the spiral fabric.

20. The method of claim 19, wherein the spiral fabric is woven in the shape of an Archimedes spiral.

21. The method of claim 19, wherein the weft yarns are inserted with a uniform or variable pick spacing.

22. The method of claim 19, wherein the weft yarns are inserted with a uniform or variable angular separation.

23. The method of claim 19, further comprising the step of:
trimming top and bottom edges of the conical shell along corresponding trim lines.

24. The method of claim 19, wherein the spiral fabric is woven on a loom equipped with a differential take-up mechanism.

25. The method of claim 23, further comprising the step of:
weaving a second continuous spiral fabric with a plurality of warp and weft yarns or fibers.

26. The method of claim 25, further comprising the step of:
wrapping the second spiral fabric over the spiral fabric of claim 20.

27. The method of claim 25, wherein the second spiral fabric is in the shape of an Archimedes spiral.

28. The method of claim 25, wherein the second spiral fabric is same as or different from the first spiral fabric.

29. The method of claim 19 or 25, wherein the warp and weft yarns or fibers are selected from the group consisting of carbon, nylon, rayon, glass fiber, ceramic, aramid, polyester, and metal yarns or fibers.

30. The method of claim 19 or 25, wherein the warp and weft yarns or fibers are selected from the group consisting of monofilaments, flat monofilaments, multifilament yarns, flat multifilament yarns, textured multifilament yarns, twisted multifilament yarns, and braided structures.

31. The method of claim 19 or 25, wherein the warp and weft yarns or fibers are coated with one or more layers of a coating, a finish or any other coating that enhances the performance of the component fibers.

32. A method of forming a fiber reinforced composite, the method comprising the steps of:
forming a fiber preform according to claim 19, and impregnating the preform in a matrix material.

33. The method of claim 32, wherein the matrix material is a resin, and the composite is formed from a process selected from the group consisting of resin transfer molding, chemical vapor filtration, wet layup and resin film infusion.

34. The method of claim 32, wherein the matrix material is selected from the group consisting of epoxy, bismaleimide, polyester, vinyl-ester, ceramic, and carbon.

35. The method of claim 32, wherein the composite is a spinner or exit cone.

* * * * *